(12) United States Patent
Golin et al.

(10) Patent No.: US 9,057,316 B2
(45) Date of Patent: Jun. 16, 2015

(54) EXHAUST COMPONENT MOUNTING STRUCTURE

(71) Applicant: Tenneco Automotive Operating Company Inc., Lake Forest, IL (US)

(72) Inventors: Michael Golin, Dexter, MI (US); Douglas Wang, Ann Arbor, MI (US); Erwin Peters, Cement City, MI (US); Kevin Reeder, Carson City, MI (US); Mike Stebli, Toledo, OH (US); Bala Gurusamy, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 269 days.

(21) Appl. No.: 13/692,127

(22) Filed: Dec. 3, 2012

(65) Prior Publication Data

US 2014/0150450 A1 Jun. 5, 2014

(51) Int. Cl.
*B01D 50/00* (2006.01)
*F01N 13/00* (2010.01)
*F01N 13/18* (2010.01)

(52) U.S. Cl.
CPC .......... *F01N 13/017* (2014.06); *F01N 13/1805* (2013.01); *F01N 13/1855* (2013.01); *F01N 2450/22* (2013.01); *F01N 2450/24* (2013.01)

(58) Field of Classification Search
CPC ............ F01N 13/1855; F01N 2450/22; F01N 13/1805; F01N 13/017; F02C 7/20
USPC ........ 422/177, 180; 248/220.21, 220.22, 244, 248/245; 55/523
See application file for complete search history.

(56) References Cited

U.S. PATENT DOCUMENTS

| 7,129,931 | B2 * | 10/2006 | Pappas .......................... 345/168 |
| 7,501,005 | B2 | 3/2009 | Thaler |
| 7,517,380 | B2 | 4/2009 | Grimm et al. |
| 7,966,979 | B2 | 6/2011 | Olsen et al. |
| 8,141,535 | B2 | 3/2012 | Olsen et al. |
| 8,191,668 | B2 | 6/2012 | Keane et al. |
| 8,297,048 | B2 | 10/2012 | Biedler et al. |
| 8,821,608 | B2 * | 9/2014 | Mitsuda .......................... 55/523 |
| 2004/0155161 | A1 * | 8/2004 | Yeh ........................... 248/220.22 |
| 2007/0119155 | A1 | 5/2007 | Tongu et al. |
| 2007/0257157 | A1 * | 11/2007 | Lu ................................ 248/68.1 |
| 2010/0186382 | A1 | 7/2010 | Schroeder et al. |
| 2010/0186394 | A1 | 7/2010 | Harrison et al. |
| 2011/0079003 | A1 | 4/2011 | Sun et al. |
| 2011/0167808 | A1 | 7/2011 | Kosaka et al. |
| 2012/0011833 | A1 | 1/2012 | Kamei et al. |
| 2012/0017574 | A1 | 1/2012 | Hasan et al. |
| 2012/0079816 | A1 | 4/2012 | Svihla et al. |
| 2012/0096833 | A1 | 4/2012 | Tan et al. |

(Continued)

FOREIGN PATENT DOCUMENTS

JP 2010-065559 3/2010
JP 2012-062809 3/2012

*Primary Examiner* — Tom P Duong
(74) *Attorney, Agent, or Firm* — Harness, Dickey & Pierce, P.L.C.

(57) ABSTRACT

An exhaust after-treatment system including a first exhaust treatment device having a first mounting surface and a second mounting surface, and a second exhaust treatment device and a third mounting surface and a fourth mounting surface. A first mounting structure is attached to the first mounting surface of the first exhaust treatment device, and a second mounting structure attached to the third mounting surface of the second exhaust treatment device, wherein the second and fourth mounting surfaces are secured to each other.

10 Claims, 6 Drawing Sheets

(56) References Cited

U.S. PATENT DOCUMENTS

| | | |
|---|---|---|
| 2012/0167558 A1 | 7/2012 | Svihla et al. |
| 2012/0273648 A1 | 11/2012 | Maske et al. |
| 2012/0311984 A1 | 12/2012 | Mitsuda |
| 2013/0039817 A1 | 2/2013 | Fukuda |

* cited by examiner

EXHAUST COMPONENT MOUNTING STRUCTURE

FIELD

The present disclosure relates to an exhaust component mounting structure, and in particular, an exhaust component mounting structure for large engine after-treatment systems.

BACKGROUND

This section provides background information related to the present disclosure which is not necessarily prior art.

Combustion engines are known to produce emissions that may be harmful to the environment. In an effort to decrease the environmental consequences that an engine may have, exhaust after-treatment systems have undergone extensive analysis and development. Various components that assist in treating engine emission include particulate filters and oxidation and reduction catalysts.

Over time, some of the various exhaust after-treatment elements may require removal and servicing. For example, in the case of a particulate filter, the particulate filter may need to be serviced after it builds up a certain amount of soot. One way of accomplishing this is to make the various after-treatment components removable from the assembly, and then cleaned separately. Depending on the size of the engine application, however, the time and difficulty of this task can increase. In this regard, larger engine applications such as locomotive, marine, and large horsepower stationary applications can produce substantially more exhaust emissions than, for example, a tractor trailer engine application. The exhaust after-treatment systems, therefore, are generally much larger in scale to adequately treat emissions produced by these large-scale applications. As the scale of the after-treatment system increases, the ability to service such a system becomes substantially more difficult, often requiring a secondary support mechanism such as a crane to assist with component removal.

That is, when the exhaust after-treatment components are relatively large and heavy, a crane or some other type of heavy-duty lifting device can be required to remove the component from the exhaust after-treatment system when the component requires servicing. In fact, it is not uncommon to require a pair of cranes to remove a single component from the exhaust after-treatment system—a first crane to lift the element from the system, and a second crane to support a no-longer-coupled end of an adjacent component. If no second crane is available, however, the time required for servicing can be increased, which is undesirable.

SUMMARY

This section provides a general summary of the disclosure, and is not a comprehensive disclosure of its full scope or all of its features.

The present disclosure provides an exhaust after-treatment system including a first exhaust treatment device having a first mounting surface and a second mounting surface, and a second exhaust treatment device and a third mounting surface and a fourth mounting surface. A first mounting structure is attached to the first mounting surface of the first exhaust treatment device, and a second mounting structure attached to the third mounting surface of the second exhaust treatment device, wherein the second and fourth mounting surfaces are secured to each other.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
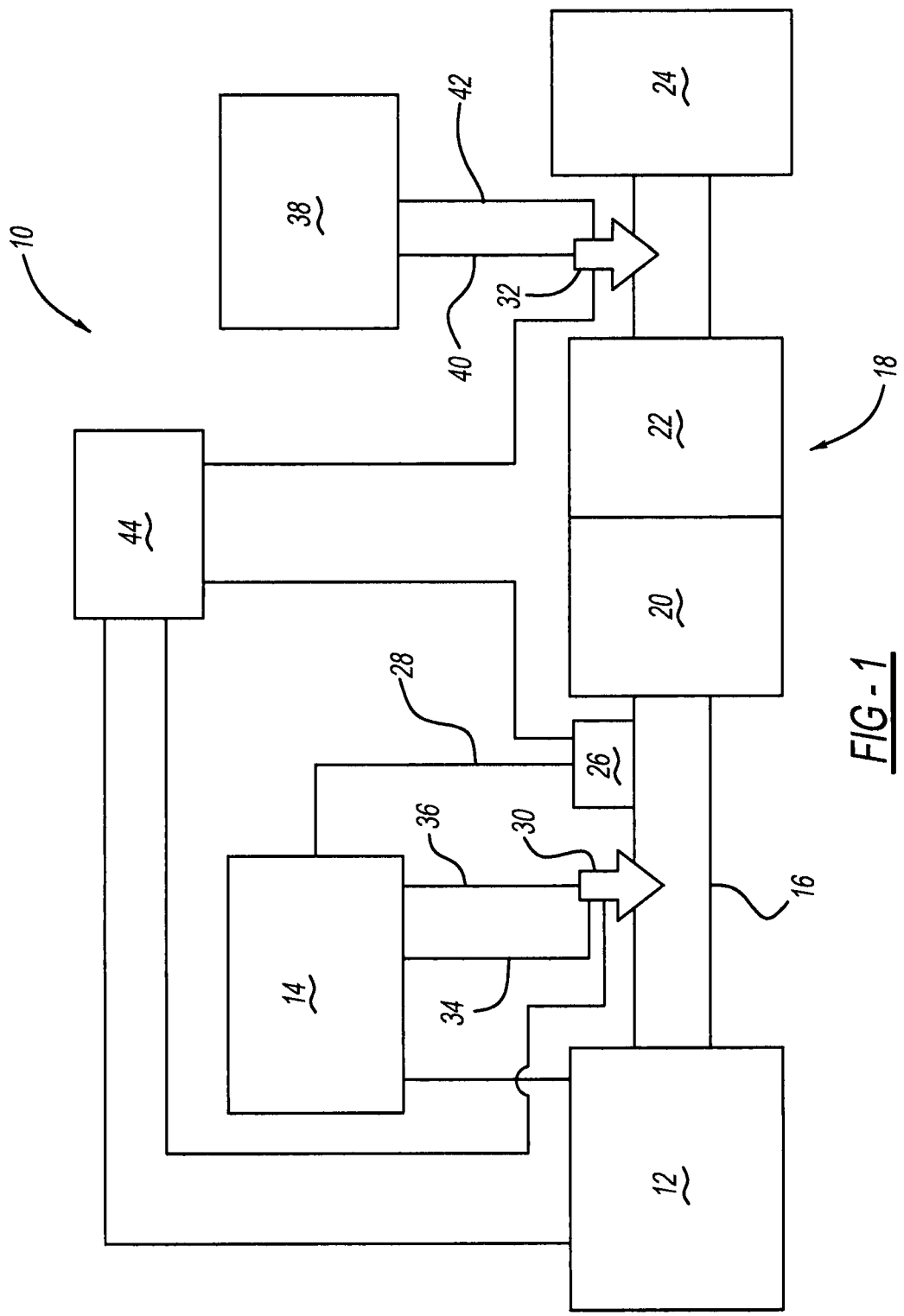
FIG. 1 is a schematic representation of an exhaust after-treatment system according to a principle of the present disclosure.

FIG. 1 is a schematic illustration of an exhaust system 10 according to the present disclosure. Exhaust system 10 includes at least an engine 12 in communication with a fuel source 14 that, once consumed, will produce exhaust gases that are released into an exhaust passage 16 having an exhaust after-treatment assembly 18. Downstream from the engine 12 can be positioned exhaust treatment devices, which can include a diesel particulate filter (DPF) component 20, a diesel oxidation catalyst (DOC) component 22, and a selective catalytic reduction (SCR) component 24. The exhaust after-treatment assembly 18 may also include components such as a burner 26 to increase a temperature of the exhaust gases passing through exhaust passage 16. Increasing the temperature of the exhaust gas may be favorable to achieve light-off of the catalyst in DOC and SCR components 22 and 24 in cold-weather conditions and upon start-up of engine 12, as well as initiate regeneration of DPF 20 when needed. In order to provide fuel to the burner 26, the burner may include an inlet line 28 in communication with the fuel source 14.

It may be desired that the DPF 20 serve as an exhaust treatment component to filter soot and other particulate matters present in the exhaust. When soot and other particular matter begins to clog the pores (not shown) of the DPF 20, the DPF 20 can be cleaned by raising the temperature of the exhaust to burn off the excess soot and particulate matter from DPF 20. For the aforementioned reasons, burner 26 is preferably located upstream from the DOC 22, SCR 24, and DPF 20. However, it should be understood that DPF 20 may be located upstream of both DOC 22 and SCR 24 and include its own designated burner for regeneration purposes, while a second burner (not shown) can be located upstream of both DOC 22 and SCR 24. A further alternative is for each of DOC 22, DPF 20, and SCR 24 to include a designated burner.

To assist in reduction of the emissions produced by engine 12, exhaust after-treatment assembly 18 can include injectors 30 and 32 for periodically injecting exhaust treatment fluids into the exhaust stream. As illustrated in FIG. 1, injector 30 can be located upstream of DOC 22 and is operable to inject a hydrocarbon exhaust treatment fluid that assists in at least reducing $NO_x$ in the exhaust stream. In this regard, injector 30 is in fluid communication with fuel source 14 by way of inlet line 34 to inject a hydrocarbon such as diesel fuel into the exhaust passage 16 upstream of DOC 22. Injector 30 can also be in communication with fuel source 14 via return line 36. Return line 36 allows for any hydrocarbon not injected into the exhaust stream to be returned to fuel source 14. Flow of hydrocarbon through inlet line 34, injector 30, and return line 36 also assists in cooling injector 30 so that injector 30 does not overheat. Other types of cooling, however, are contemplated. For example, injector 30 can be provided with a cooling jacket (not shown) where coolant can be passed through to cool injector 30. Injector 30 may alternatively be supplied with an exhaust treatment fluid other than fuel from tank 14 without departing from the scope of the present disclosure.

Injector 32 may be used to inject an exhaust treatment fluid such as urea into exhaust passage 16 at a location upstream of SCR 24. Injector 30 is in communication with a reductant tank 38 via inlet line 40. Injector 32 also is in communication with tank 38 via return line 42. Return line 42 allows for any urea not injected into the exhaust stream to be returned to tank 38. Similar to injector 30, flow of urea through inlet line 40, injector 32, and return line 42 also assists in cooling injector 32 so that injector 32 does not overheat. Injector 32, however, may also be provided with a cooling jacket (not shown) in a manner similar to injector 30.

Large-scale diesel engines used in locomotives, marine applications, and stationary applications can have exhaust flow rates that exceed the capacity of a single injector. Accordingly, although only a single injector 30 is illustrated for hydrocarbon injection and only a single injector 32 is illustrated for diesel treatment fluid injection, it should be understood that multiple injectors for both hydrocarbon and diesel treatment fluid injection are contemplated by the present disclosure.

A controller 44 may be provided to control various features of exhaust system 10, including engine 12 and exhaust after-treatment assembly 18. Specifically, with respect to controlling elements of exhaust after-treatment assembly 18, controller 44 may be operable to control burner 26 and injectors 30 and 32. To control each of these elements, various sensors (not shown) may be disposed at positions throughout exhaust after-treatment assembly 18 to monitor, for example, exhaust temperature, $NO_x$ concentration, pressure, back flow pressure of particulate build up, flow rate, exhaust treatment fluid temperature and pressure, and the like.

In large engine applications, the production of various exhaust after-treatment components may be cost prohibitive due to the scale necessary to effectively treat the large amount of exhaust produced during operation of engine 12. In this regard, the ceramic substrates of, for example, the DOC 22, DPF 20, and SCR 24 can be very expensive to produce. For this reason, instead of making large-scale exhaust treatment components commensurate in size with the large engine application, the exhaust flow can be divided into a plurality of exhaust passages 16 that each include a burner 26, DOC 22, DPF 20, and SCR 24 element that are more conventional in scale.

Figure 9:
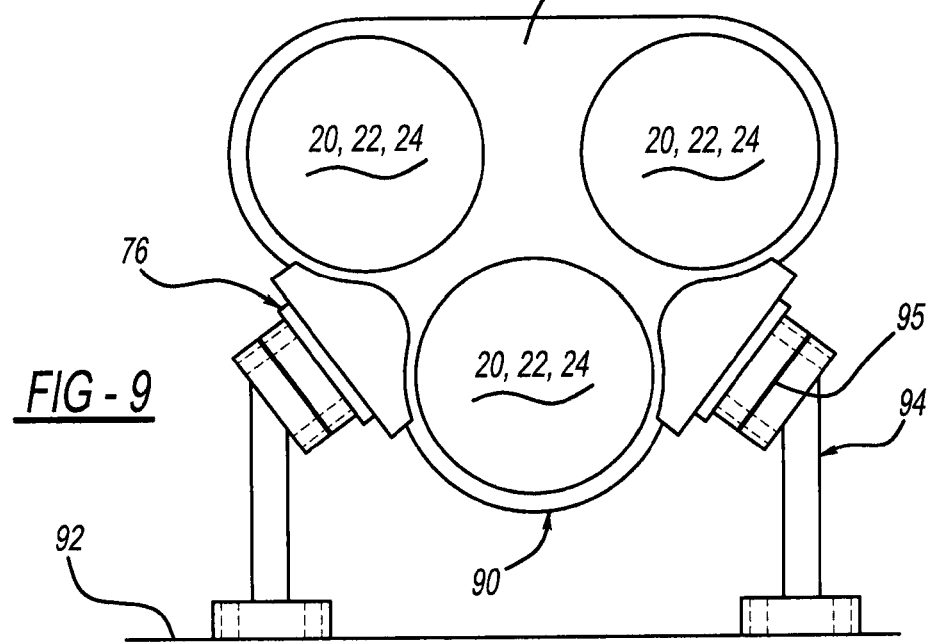
FIG. 9 is front view of an exhaust after-treatment element section including a pair of mounting structures according to a principle of the present disclosure.

Alternatively, in lieu of dividing of the exhaust flow into a plurality of exhaust passages 16 that use conventionally sized DOC 22, DPF 20, and SCR 24 or producing large-scale exhaust treatment components 20, 22, and 24 that may be cost prohibitive, the exhaust treatment assembly 18 may include an array of the exhaust system components. Referring to FIGS. 2-5, the after-treatment element sections may contain a plurality of exhaust treatment components 20, 22, and 24. As illustrated, the components 20, 22, and 24 can be cylindrically shaped, but any shape known or desired by one skilled in the art is contemplated. For example, the components can be cubical, parallelepiped, or any other shape known or desired. Likewise, as shown in FIG. 9, the exhaust components are arranged in a reverse pyramidal arrangement, but any configuration known or desired by one skilled in the art is contemplated.

Figure 2:
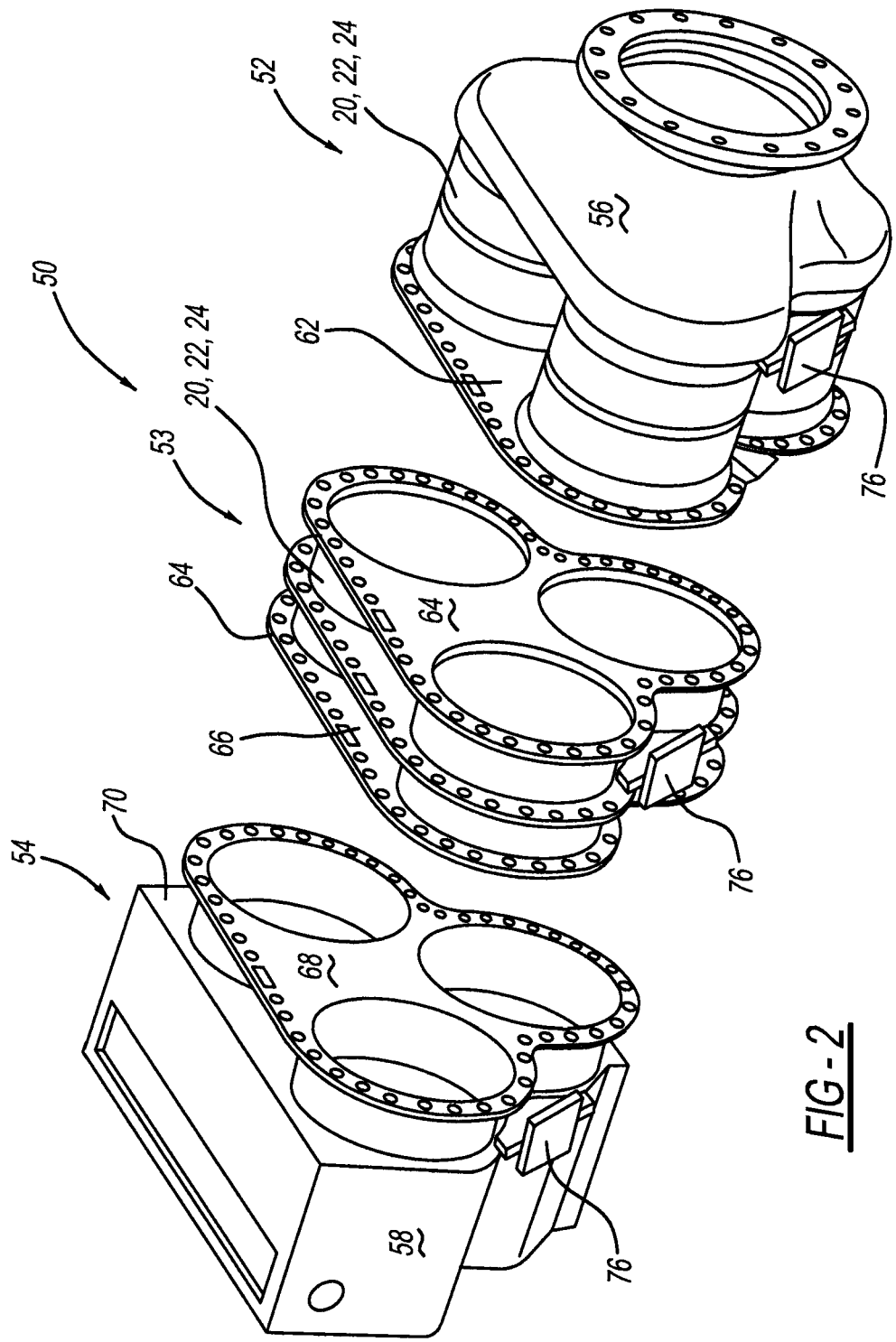
FIG. 2 is an exploded perspective view of an exemplary exhaust after-treatment system according to a principle of the present disclosure.

Referring to FIG. 2, the exhaust after-treatment assembly 50 may include a first after-treatment element section 52, a second after-treatment element section 53, and a third after-treatment element section 54. Each after-treatment element section 52-54 is operable to support a plurality of exhaust treatment components 20, 22, or 24. Regarding the exhaust treatment components supported by each element section 52-54, each exhaust treatment component may be the same (e.g., all oxidation catalysts 20), or a combination of exhaust treatment components may be supported. First after-treatment element section 52 may include an inlet housing 56 that couples first after-treatment element section 52 to exhaust passage 16. Similarly, third after-treatment element section 54 can include an outlet housing 58 that releases the treated exhaust gases to the atmosphere.

Figure 3:
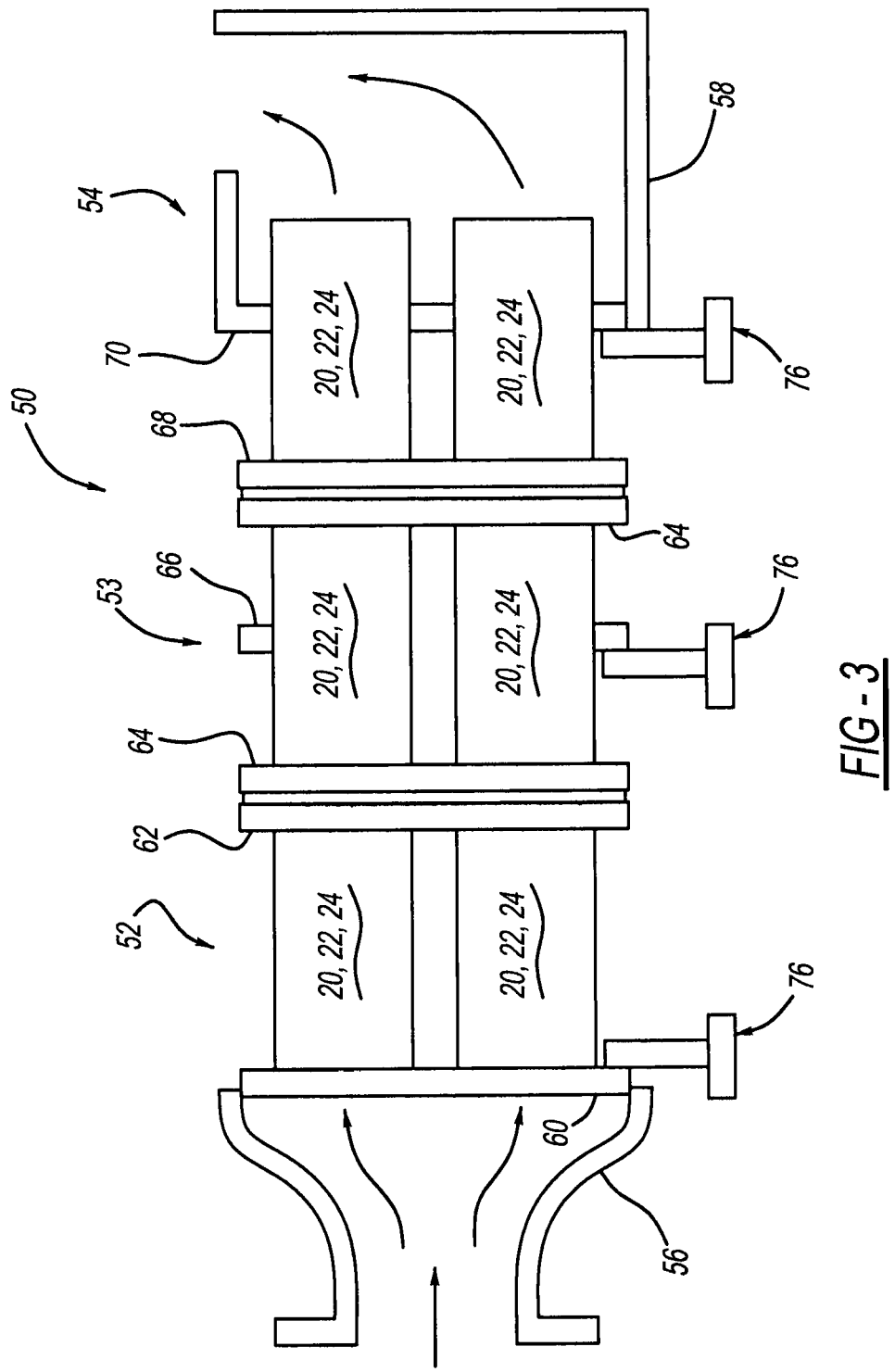
FIG. 3 is a cross-sectional view of the exhaust after-treatment system illustrated in FIG. 2.

According to a principle of the present disclosure, each after-treatment element section 52-54 is designed to include a first mounting surface that is load-bearing and a second mounting surface that is non-load-bearing. For example, first after-treatment element section 52 is designed to include a first flange and a second flange, with one of the first and second flanges designed to be load-bearing. More specifically, referring to FIG. 3, first after-treatment element section 52 includes a load-bearing flange 60 and a non-load-bearing flange 62. Load-bearing flange 60, as will be described in more detail below, is designed to bear the weight of first after-treatment element section 52. In contrast, non-load bearing flange 62 is designed as a service flange that couples first after-treatment element section 52 to the adjacent second after-treatment element section 53. Exhaust inlet housing 56 can be coupled to load-bearing flange 60 of first after-treatment element section 52, as illustrated in FIG. 3.

Second after-treatment element section 53 includes a pair of non-load-bearing flanges 64 that couple second after-treatment element section 53 to the adjacent first and third after-treatment element sections 52 and 54. The non-load bearing flange 64 coupled to first after-treatment section 52 may be referred to as a first connection flange or an inlet flange. Similarly, the non-load bearing flange 64 coupled to third after-treatment element section 54 may be identified as an outlet flange or a second connection flange. Because second after-treatment element section 53 is disposed between the adjacent first and third after-treatment element sections 52 and 54, second after-treatment element section 52 also includes a load-bearing flange 66 at a mid-plane between the non-load bearing flanges 64. As such, load-bearing flange 66 may be referred to as a mid-plane flange or a third flange.

Third after-treatment section 54 is not designed to include a flange that is load-bearing. Rather, third after-treatment element section 54 includes non-load-bearing flange 68 that couples third after-treatment section 54 to the adjacent second after-treatment element section 53, and also includes a load-bearing surface 70 that defines a portion of exhaust outlet housing 58.

The significance of each element of the exhaust after-treatment system 50 having a load-bearing flange or surface is that each element of the system 50 is relatively large and heavy to accommodate the large amounts of exhaust emitted by a large-scale engine used in, for example, locomotive, marine, and stationary applications. Due to the large size of these elements, the servicing of these elements can be difficult, as will be described in more detail below.

The exhaust after-treatment system 50 of the present disclosure removes the need for multiple cranes or lifting devices to remove elements from the exhaust after-treatment system. In this regard, as noted above, each element of the after-treatment system 50 includes at least a load-bearing surface or flange. At these load-bearing surfaces or flanges are disposed mounting structures 76 that support each after-treatment element section 52-54 relative to one another.

In particular, first exhaust after-treatment element section 52 includes a mounting structure 76 at load-bearing flange 60; second exhaust after-treatment element section 53 includes a mounting structure 76 at load-bearing flange 66; and third exhaust after-treatment element section 54 includes a mounting structure 76 at load-bearing surface 70. Due to each after-treatment element section 52-54 having a load-bearing surface to which a mounting structure 76 is attached, when one of these elements is removed from after-treatment system 50, the remaining elements will remain supported without relying on an adjacent component to bear some of its weight.

For example, if second exhaust after-treatment element section 53 is removed from exhaust after-treatment system 50, the adjacent elements in the after-treatment system 50 such as first exhaust after-treatment element section 52 and third exhaust after-treatment system 54 will remain supported, without the use of a crane or lifting device, through use of mounting structure 76 attached at load-bearing flange 66. Accordingly, only a single crane would be needed to remove second exhaust after-treatment element section 52. This increases the ease with which exhaust after-treatment system 50 can be serviced, which reduces the downtime of the large-scale engine to which exhaust after-treatment system 50 is coupled.

Figure 4:
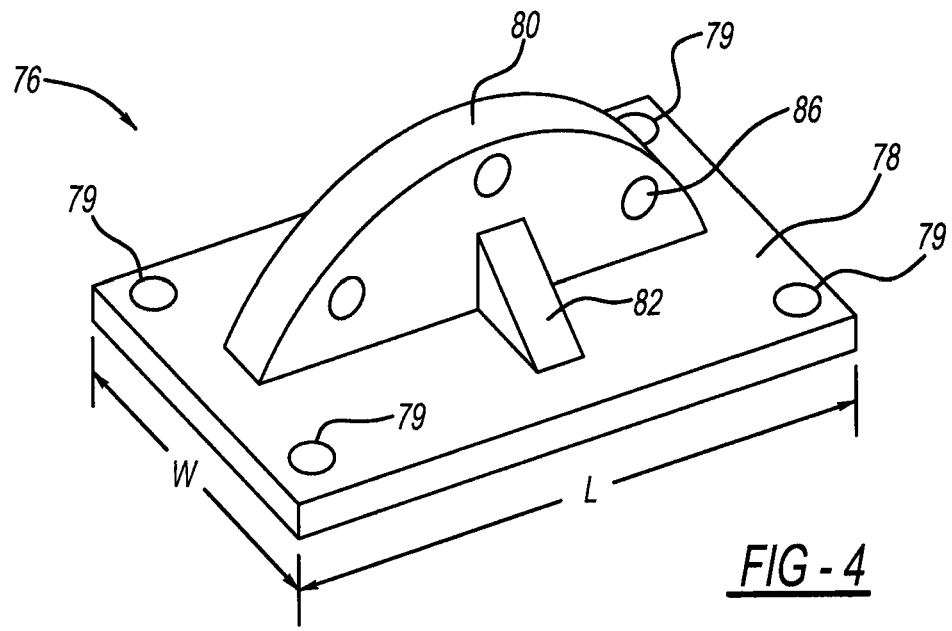
FIG. 4 is a perspective view of an exemplary after-treatment mounting structure according to a principle of the present disclosure.
Figure 5:
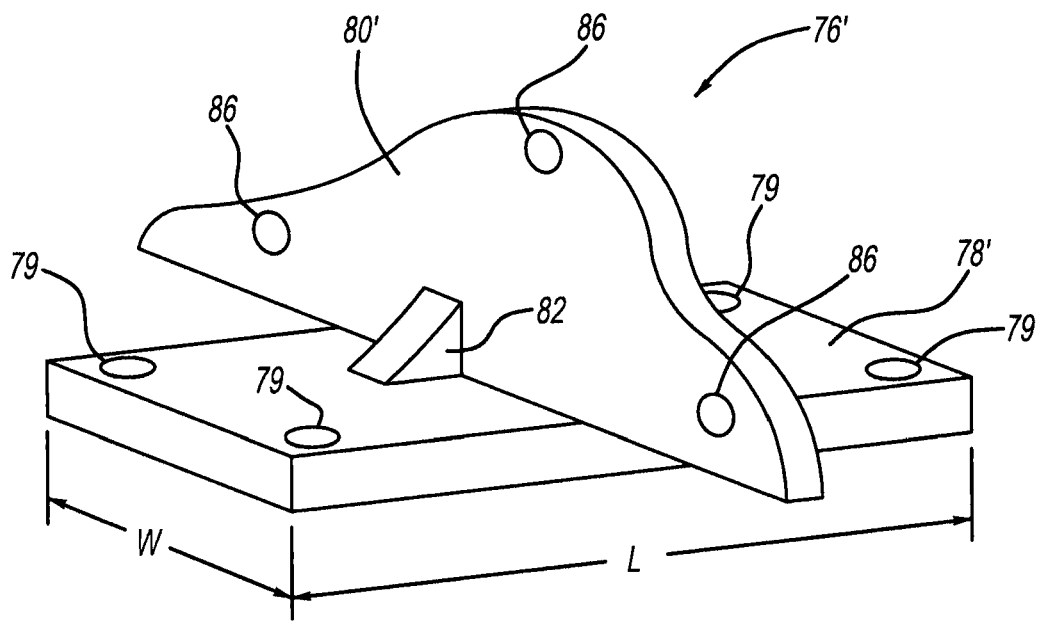
FIG. 5 is a perspective view of another exemplary after-treatment mounting structure according to a principle of the present disclosure.
Figure 6:
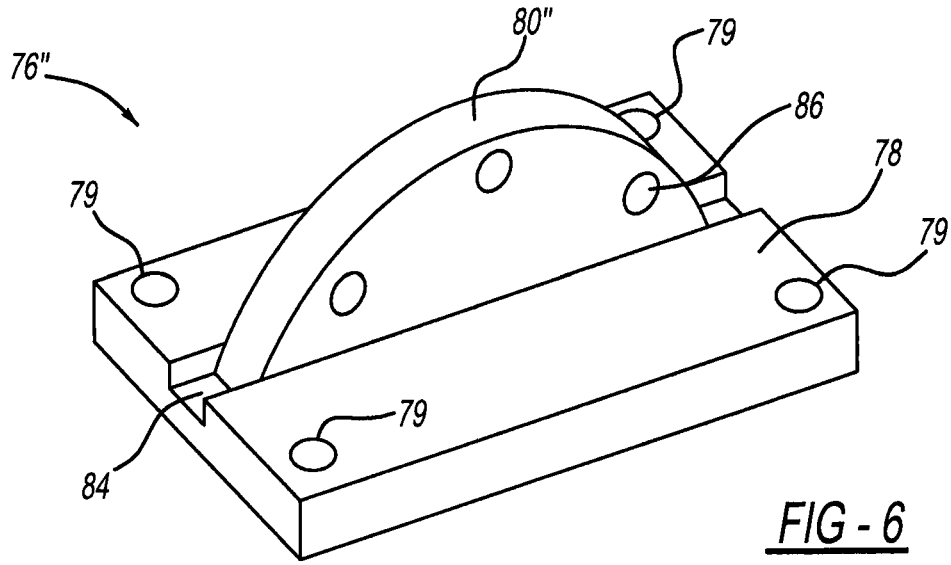
FIG. 6 is a perspective view of another exemplary after-treatment mounting structure according to a principle of the present disclosure.

Exemplary mounting structures 76 are illustrated in FIGS. 4-6. As illustrated in these figures, each mounting structure 76 include a base pad 78 and a connection pad 80 that is arranged perpendicular to base pad 78. Base pad 78 can be a generally planar member having apertures 79 for connecting base pad 78 to another structure using fasteners (not shown) such as bolts or screws. Connection pad 80 couples to the load-bearing flange or load-bearing surface of each component. To increase the robustness of connection pad 80 relative to base pad 78, the mounting structures 76 and 76' illustrated in FIGS. 4 and 5, respectively, can also include gussets 82 that provide additional structural support to connection pad 80.

FIG. 4 illustrates a configuration where connection pad 80 is arranged perpendicular to base pad 78 along a length L of base pad 78. In contrast, FIG. 5 illustrates a mounting structure 76' where connection pad 80' is arranged perpendicular to base pad 78' along a width W of base pad 78'. Connection pad 80' overhangs base bad 78' at both ends. An alternative configuration includes connection pad 80' being cantilevered over base pad 78' at only one end. Further, mounting structure 76' illustrated in FIG. 5 includes a connection pad 80' that is shaped like a sailor's hat. Connection pad 80' in FIG. 5, however, can also be semicircular in shape, like that illustrated in FIG. 4. Similarly, the semicircular-shaped connection pad 80 illustrated in FIG. 4 can be shaped like a sailor's hat, without departing from the scope of the present disclosure.

FIG. 6 illustrates a mounting structure 76" that is devoid of gussets 82. Regardless, to ensure proper structural support between base pad 78" and connection pad 80", mounting structure 76" includes a recess 84 formed in base pad 78" that receives connection pad 80". To secure connection pad 80" to recess 84, connection pad 80" may be welded to recess 84 and base pad 78"

Figure 7:
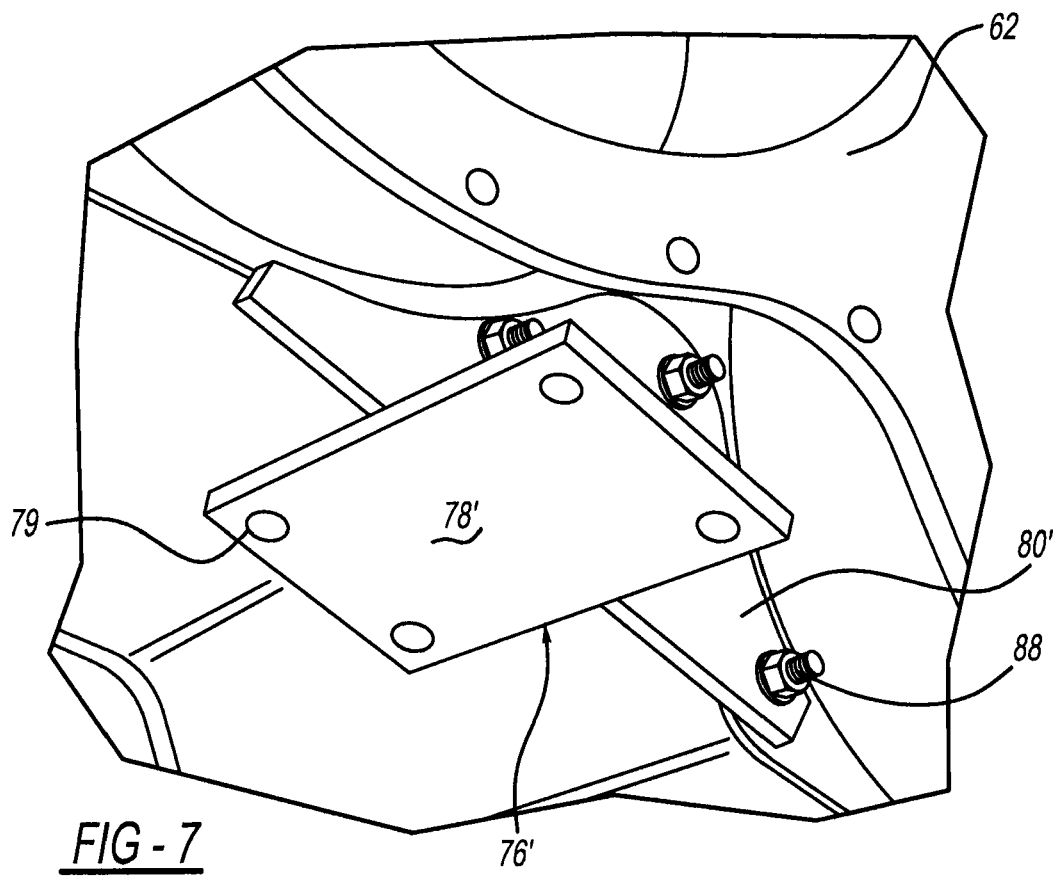
FIG. 7 is a perspective view of an after-treatment mounting structure coupled to an exhaust treatment device according to a principle of the present disclosure.

To connect mounting structures 76 to the load-bearing flanges or load-bearing surfaces of the elements of the exhaust after-treatment system 50, connection pad 80 can include a plurality of apertures 86 that receive a fastener such as a bolt. Specifically, referring to FIG. 7, it can be seen that mounting structure 76' is attached to load-bearing flange 60 of first after-treatment element section 52 using bolts 88. It should be understood that mounting structure 76' can additionally be welded to load-bearing flange 60 to increase the robustness between mounting structure 76' and load-bearing flange 60, without departing from the scope of the present disclosure. In this regard, mounting structures 76 are preferably formed from a material such as steel. Such a material provides sufficient mechanical and structural strength, and is easily weldable.

As mounting pads 76 are designed to support each exhaust after-treatment element section 52-54 without an adjacent element section providing load-bearing assistance, it is preferable that mounting structures 76 are attached to each after-treatment element section 52-54 at an underside of each section. For example, again referring to FIG. 3, it can be seen that each mounting structure 76 is provided underneath after-treatment system 50.

Further, it should be understood that a plurality of mounting structures 76 may be used to support each after-treatment element section 52, 53, and 54. For example, referring to FIG. 8, it can be seen that at least a pair of mounting pads 76 can be used to support third exhaust after-treatment element section 54, which is shown in an inverted position. A pair of mounting structures 76 are secured to load-bearing surface 70 to support third after-treatment element section 54. By using a pair of mounting structures 76, the weight of third after-treatment element section 54 is further more reliably supported.

Figure 8:
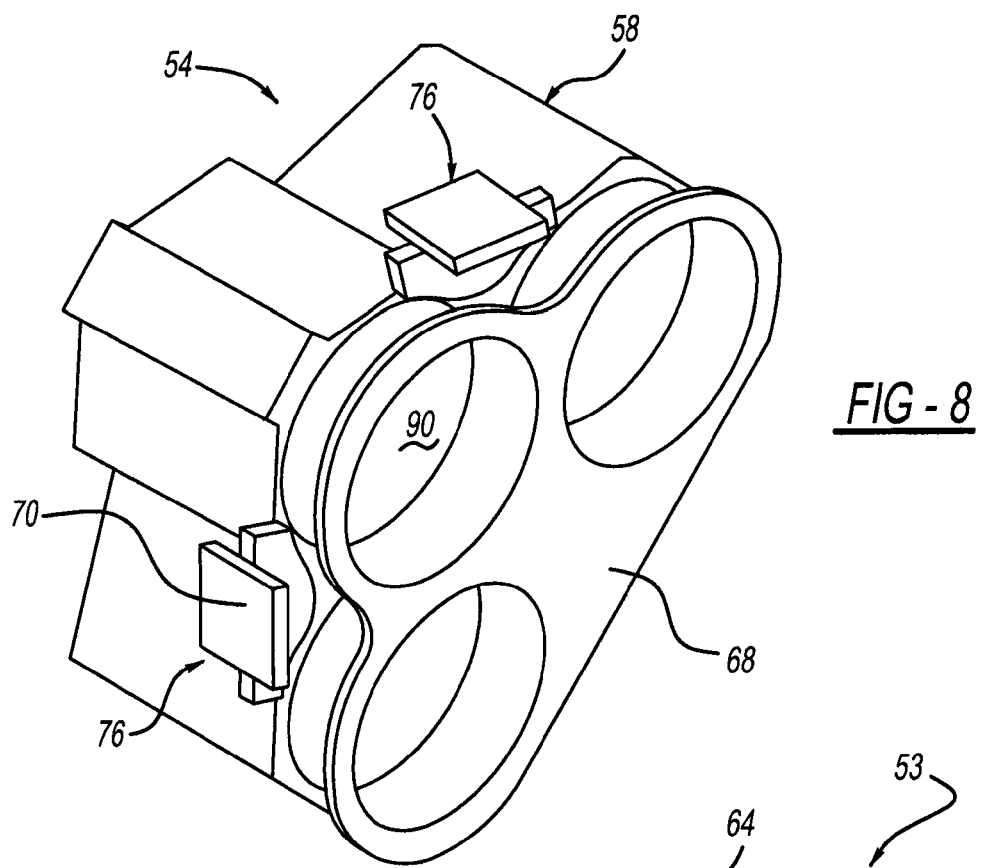
FIG. 8 is a perspective view of an exhaust after-treatment element section including a pair of mounting structures according to a principle of the present disclosure.

Because mounting structures 76 illustrated in FIG. 8 are not disposed directly beneath third after-treatment element section 54, an additional mounting structure may be needed to fully support the after-treatment element section. That is, as can be seen in FIG. 8, mounting structures 76 are shown disposed at positions adjacent a bottom-most exhaust treatment component 90. Because mounting pads 76 are disposed at this position, bottom-most exhaust treatment component 90 will interfere with securing mounting pads 76 to a frame or floor 92 (FIG. 9) to which exhaust treatment system 50 will be mounted. Accordingly, secondary mounting structures 94 can be provided that couple to mounting structures 76.

Referring to FIG. 9, an exhaust after-treatment element section is shown supported by a pair of mounting structures 76 that are provided at positions adjacent a bottom-most exhaust treatment component 90. Mounting structures 76 are, in turn, secured to secondary mounting structures 94 that are secured to frame or floor 92. Secondary mounting structures 94 ground the system by restricting motion in the axial direction (i.e., a direction from inlet to outlet), but allow for vibration of the system. Notwithstanding, to reduce vibration of the system as much as possible, a vibration isolator 95 can be disposed between the secondary mounting structure 94 and the mounting structures 76. In the particular exemplary embodiment illustrated, second exhaust after-treatment element section 52 is shown supported by mounting structures 76 and secondary mounting structures 94. Although not shown in FIG. 9, it should be understood that mounting structures 76 may be secured to load-bearing flange 66 provided at a mid-plane of second exhaust after-treatment element section 52. Regardless, through use of mounting structures 76 and secondary mounting structures 94, second exhaust after-treatment element section 52 is robustly supported in a manner that, if an adjacent exhaust after-treatment element section 52 or 54 is removed, no additional lifting device or crane is required to support its weight.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system, comprising:
   an first exhaust after-treatment element section including a first array of exhaust treatment components, the first exhaust after-treatment element section including a first load-bearing flange and a first non-load-bearing flange;
   a first mounting structure fixed to the first load-bearing flange for supporting the first exhaust after-treatment element section;
   an second exhaust after-treatment element section including a second array of exhaust treatment components, the second exhaust after-treatment element section including an inlet flange removably coupled to the first non-load-bearing flange, an outlet flange, and a mid-plane flange located between the inlet flange and the outlet flange;
   a second mounting structure fixed to the mid-plane flange for supporting the second exhaust after-treatment element section;
   a third exhaust after-treatment element section including a third array of exhaust treatment components, the third exhaust after-treatment element section including a third non-load-bearing flange removably coupled to the outlet flange, and a load-bearing surface; and
   a third mounting structure fixed to the load-bearing surface for supporting the third exhaust after-treatment element section.

2. The exhaust after-treatment system of claim 1, wherein each of the mounting structures include a base pad and a connection pad, the connection pads being secured to the first load-bearing flange, the second load-bearing flange, and the mid-plane flange, respectively.

3. The exhaust after-treatment system of claim 2, wherein the connection pad is arranged perpendicular to the base pad.

4. The exhaust after-treatment system of claim 2, wherein the base pad includes a recess that receives the connection pad.

5. The exhaust after-treatment system of claim 2, wherein the connection pad is arranged perpendicular to the base pad in a length direction of the base pad.

6. The exhaust after-treatment system of claim 2, wherein the connection pad is arranged perpendicular to the base pad in a width direction of the base pad.

7. The exhaust after-treatment system of claim 2, wherein the connection pads are secured to the first load-bearing flange, the load-bearing surface, and the mid-plane flange, respectively, using fasteners.

8. The exhaust after-treatment system of claim 7, wherein the connection pads are secured to the first load-bearing flange, the load-bearing surface, and the mid-plane flange, respectively, by welding.

9. The exhaust after-treatment system of claim 1, wherein each of the mounting structures independently support the exhaust after-treatment element sections when one of the exhaust after-treatment element sections is removed.

10. The exhaust after-treatment element system of claim 1, wherein the exhaust treatment components are selected from the group consisting of particulate filters, oxidation catalysts, and selective reduction catalysts.

\* \* \* \* \*